(12) United States Patent
Cherdron

(10) Patent No.: US 7,212,212 B2
(45) Date of Patent: *May 1, 2007

(54) CONTEXT ATTRIBUTE DETERMINATION

(75) Inventor: Markus Cherdron, Muehlhausen (DE)

(73) Assignee: Sap AG, Walldorf (DE)

( * ) Notice: Subject to any disclaimer, the term of this patent is extended or adjusted under 35 U.S.C. 154(b) by 208 days.

This patent is subject to a terminal disclaimer.

(21) Appl. No.: 10/931,934

(22) Filed: Sep. 1, 2004

(65) Prior Publication Data

US 2006/0044318 A1    Mar. 2, 2006

(51) Int. Cl.
*G09G 5/00*    (2006.01)
(52) U.S. Cl. .................................................... 345/581
(58) Field of Classification Search ................ 345/581; 700/8–20, 23–25, 27–34, 97, 103, 106–112, 700/FOR. 104; 703/1, 2, 22–28; 715/500–542, 715/700–703, 708, 717–721, 733, 745, 748, 715/750, 760, 764, 769, 771, 901–904, 968; 717/100–167
See application file for complete search history.

(56) References Cited

U.S. PATENT DOCUMENTS

2005/0071805 A1*  3/2005  Lauterbach et al. ........ 717/104
2005/0257157 A1* 11/2005  Gilboa et al. ............... 715/747
2005/0267725 A1* 12/2005  Reeder et al. ................ 703/22

* cited by examiner

*Primary Examiner*—Kee M. Yung
*Assistant Examiner*—G. F. Cunningham
(74) *Attorney, Agent, or Firm*—Finnegan, Henderson, Farabow, Garrett & Dunner, L.L.P.

(57) ABSTRACT

Methods and apparatus, including computer program products, for developing and executing applications include using an extended version of the model-view-controller (MVC) paradigm. The techniques include a model for an application, the model including multiple model elements, at least one view for presenting data from the model, the view including multiple user interface (UI) elements, and at least one controller for manipulating the model and the view. The techniques also include a structure for storing application data for at least one storage area relating to the controller, the structure defined by multiple elements and directed relationships coupling the elements, at least one of the elements associated with a routine for retrieving and manipulating application data. A binding exists between one of the UI elements and one of the structure elements.

20 Claims, 9 Drawing Sheets

AT DESIGN TIME

CONTEXT 304

AT RUNTIME

CONTEXT 304

CONTEXT ATTRIBUTE DETERMINATION

BACKGROUND

The present invention relates to electronic data processing in general, and particularly to application programming.

In the model-view-controller (MVC) design methodology used for developing application programs, one or more models can implement the application logic of an application program. Each model can correspond to multiple views, where each view displays information about the model to a user. A controller of the application can receive events, for example, raised by a user interacting with a view to manipulate the model.

A model can have multiple controllers, and controllers can relate to one or more views. Controllers can also relate to an application in general, or to one or more application parts or components. Models and controllers typically include application code. When changes occur in a model, the model can update its views.

Data binding can be used for data transport between a view and its model or controller. For example, a table view can be defined to display data of a corresponding table that is stored in the model or controller. The table is used as the data source for the table view (data binding). For instance, the table view can be replaced by a further view, such as a form view, that binds against the same table. In this case, the further view can display the table data without changing anything in the controller or the model.

When building a software application, predefined relationships can exist between various data elements used by the application. Predefined relationships can be defined in a variety of ways; for example, the relationships can be defined through dependencies in a relational database. However, for some data elements, predefined relationships do not exist, for example, when no relationship is defined in a database or when it is data elements that refer to the model on the one hand and to the view on the other hand. Therefore, usually a significant portion of an application's code is devoted to defining the corresponding relationships and to enabling data transport, for example, from the model to the view.

Moreover, at a given point in time, an application has a specific state that reflects the current status of the interaction of the user with the application (e.g., which view the cursor of the application is currently situated on, and which row of a specific table in the view has been selected by the user). Typically, an application developer has to write application coding to memorize and administer the state (e.g., by using state variables).

SUMMARY

The present invention provides methods, systems, and computer program products that implement techniques for extending the MVC methodology by structuring data of an application into application contexts.

In general, in one aspect, a technique can include establishing a model for an application, the model including multiple model elements, establishing at least one view for presenting application data, the view including multiple user interface (UI) elements, and establishing at least one controller for manipulating the model and the view. The technique can also include establishing a structure for storing application data for at least one storage area relating to the controller. The structure can defined by multiple elements and directed relationships coupling the elements, wherein at least one of the elements is associated with a routine for retrieving and manipulating application data. The routine can, for example, generate view data. The technique can additionally include establishing at least one binding between one of the UI elements and one of the structure elements.

The structure elements can include nodes and attributes, and the routine can be associated with at least one attribute. The routine can be operable to receive a request for view data associated with an attribute, retrieve application data associated with the attribute, and calculate a value for the attribute based on the application data.

The routine can be invoked on a controlled basis. For example, the routine can be invoked to fill a displayed portion of the view. The routine also can manipulate application data in the storage area and allow storage area data to be set. The routine can additionally receive user-provided data and manipulate the data into an application data format.

In another general aspect, a system can include a model for an application, at least one view, a controller, and a structure that can store application data for at least one storage area relating to the controller. The model can include multiple model elements, and the view can include multiple user interface (UI) elements. The controller can manipulate the model and the view. The structure can be defined according to multiple elements and directed relationships coupling the elements, at least one of the elements being associated with a routine for retrieving and manipulating application data. The system also can include at least one binding between one of the UI elements and one of the structure elements.

The structure elements can include nodes and attributes, and the routine can be associated with at least one attribute. The routine can be operable to receive a request for view data associated with an attribute, retrieve application data associated with the attribute, and calculate a value for the attribute based on the application data.

The routine can be invoked on a controlled basis. For example, the routine can be invoked to fill a displayed portion of the view. The routine also can manipulate application data in the storage area and allow storage area data to be set. The routine can additionally receive user-provided data and manipulate the data into an application data format.

In yet another general aspect, a technique can include accessing a predetermined structure for a storage area that relates to a controller, the controller being operable to manipulate an application model and a view that includes multiple user interface (UI) elements for presenting application data. The predetermined structure can include multiple design-time elements and directed relationships between the design-time elements, wherein at least one of the elements is associated with a routine for retrieving and manipulating application data, and at least one of the UI elements is bound to one of the design-time elements. The technique also can include creating an instance of the storage area according to the predetermined structure, the instance of the storage area including multiple runtime elements that each correspond to one of the design-time elements.

The routine can be operable to receive a request for view data associated with an attribute, retrieve application data associated with the attribute, and calculate a value for the attribute based on the application data. The routine also can be operable to receive user-provided data and manipulate the data into an application data format. The routine can be invoked on a controlled basis.

The techniques can be implemented to realize one or more of the following features. A system implementing an extended MVC methodology in accordance with the invention can reduce the amount of storage that is needed to store an interaction status by eliminating redundant data storage. A system implementing an extended MVC methodology can also improve data consistency within an application, by eliminating the program code redundancy that originates from using multiple variables for the same data. Such a system can additionally define relationships between data elements in a declarative way. Therefore, specific functions (e.g., filter functions) can be implemented without application-specific program code. Data relationships can be declared generically, which enables the data relationships to be used by views that are developed using different technologies or formats, (e.g., PDF instead of HTML).

Also, attributes can be logically described based on the data to be displayed in a view. Thus, the viewed attributes may be determined based on the data to be displayed. This can reduce the computational complexity of preparing application data for presentation and memory usage while allowing application data to be presented to users in a meaningful manner. Furthermore, the code to retrieve and manipulate application data to be displayed can be called on a controlled basis (e.g., as needed). For example, if only five records of a database can be displayed in a view at one time, the retrieval and manipulation may be performed for the five records that are currently to be displayed. This can also reduce computational complexity and memory usage.

These general and specific aspects can be implemented using a computer program, a method, a system or apparatus, or any combination of computer programs, methods, or systems and apparatuses. The details of one or more implementations are set forth in the accompanying drawings and in the description below. Other features, objects, and advantages will be apparent from the description, the drawings, and the claims.

DESCRIPTION OF DRAWINGS

Like reference symbols in the various drawings indicate like elements.

DETAILED DESCRIPTION

The present invention extends the MVC design pattern to include the concept of contexts. This will be referred to as the extended MVC design pattern.

Figure 1:
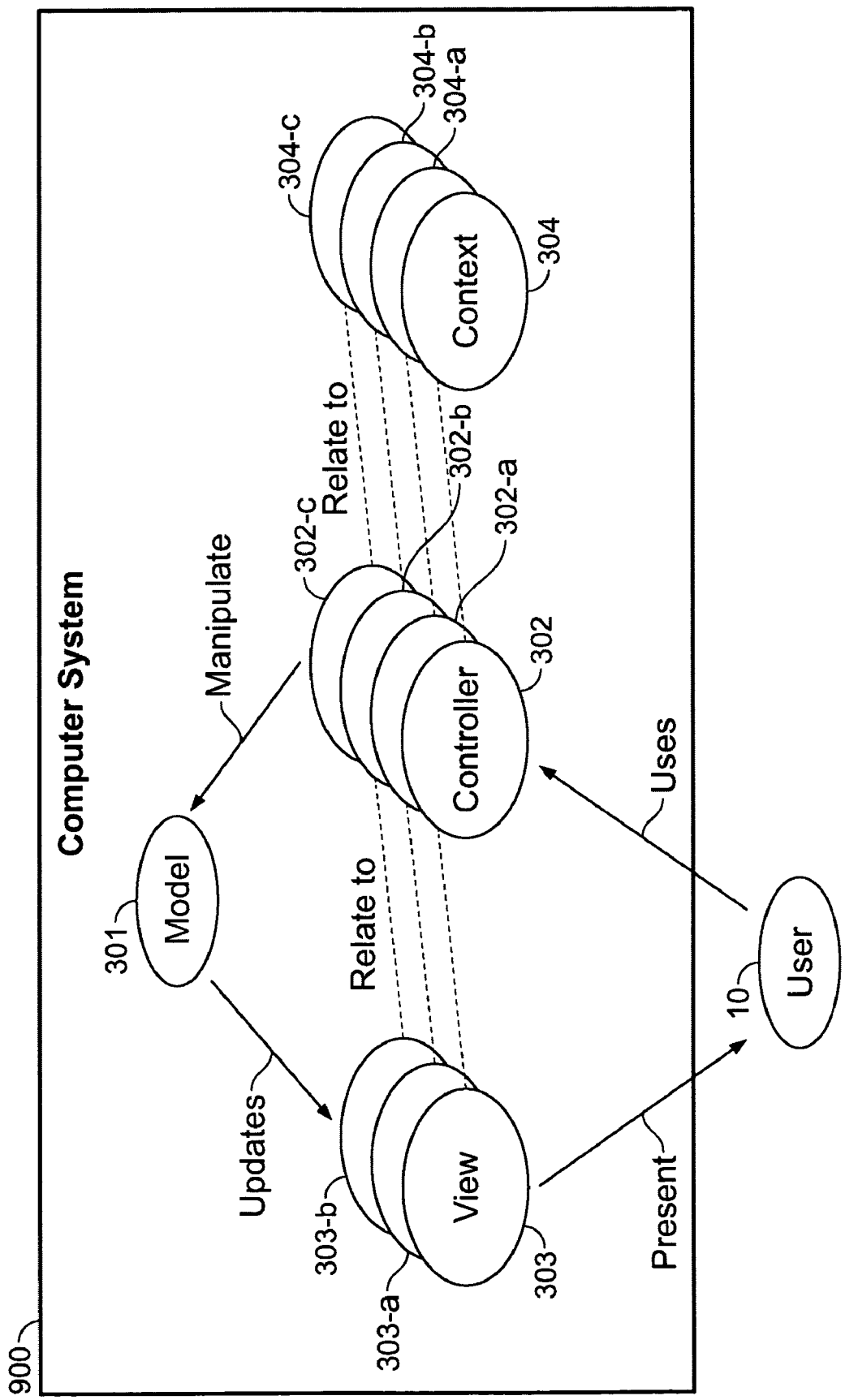
FIG. 1 is a simplified block diagram of a computer system that implements an extended MVC design pattern with application contexts.

FIG. 1 is a simplified block diagram of a computer system 900 that realizes an implementation of the extended MVC design pattern. In general, the extended MVC design pattern provides a context as a storage place for data that relates to a controller. A context can be used to store the local data of a controller, as well as data fields that reference data stored in other contexts or defined in a model (mapping between contexts is explained below). Data in local data fields can exist as long as the corresponding context exists. The lifecycle of data in a model can be managed externally. A context storage space can be structured, as illustrated below.

The user interface (UI) elements in a view can be bound to the data elements in a context. In this manner, multiple UI elements can display the same data (and can be used to modify the data), without having to transport the data between the views or create multiple copies of the data. Moreover, the data elements in a context can be bound to data elements in a model. In this manner, the extended MVC design pattern interposes contexts between views and models. Rather than binding UI elements in views directly to a model, the extended MVC design pattern uses contexts as intermediary storage that stores only the data needed by an application. A context also can be used to identify, extract, and maintain the user state of an application, which includes the portion of a model that is relevant for a particular application and user. A context can thus act as a buffer between the views and the model, allowing applications to perform many optimizations—for example, a context can be used to store recently used data so that such data does not need to be re-calculated in the course of the execution of an application. By acting as a buffer, a context also allows model instances to be used by multiple user instances.

A context instance 304 generally relates (dashed line) to a controller instance 302. Context instances and controller instances will be referred to as contexts and controllers, respectively. The controller 302 can manipulate a model 301 in response to an interaction of a user 10 with the computer system 900. There can be additional controllers (e.g., additional controllers 302-a, 302-b, 302-c) for manipulating the same model 301. The additional controllers can have additional contexts 304-a, 304-b, 304-c that relate (dashed lines) to the additional controllers, respectively. The model 301 can have multiple views (e.g., views 303, 303-a, 303-b) that present data about the model to the user 10. When the model 301 gets modified by at least one of its controllers, it can update its views. Each view relates (dashed lines) to a controller. There can be controllers (e.g., controller 302-c) that do not relate to any view. In certain implementations, a controller can relate to multiple views.

In some application development environments, application development is divided into two general stages: a design-time process and a runtime process. The design-time process can include steps such as designing the views of an application (including the layout of the user interface elements in each view), modeling of the application flow (including the navigation between the views), designing one or more models, and creating and editing other application components, such as controllers and contexts. The design-time process can also include other steps, such as the binding of UI elements within the views to data sources that are defined in a data type repository.

The information created during the design-time process can include application metadata. The application metadata can be stored in a metadata repository and used as input to the runtime process. During the runtime process, the application metadata can be used to generate the actual runtime code of an application. In some implementations, the application metadata is platform-independent, and the generated runtime code is platform-specific. The runtime code can be executed in a runtime environment that provides a general framework for running applications. For example, a runtime environment can provide services for deploying and maintaining applications, as well as features such as a caching mechanism that can be used to improve performance, and automatic input assistance and default error handling that is based on the declared application metadata.

In the extended MVC design pattern, the declared application metadata can include a description of the data elements in a context and the relationships between those data elements. In one implementation, the context metadata is arranged into a tree structure (referred to as a metadata tree) to reflect a hierarchical relationship between the data elements (e.g., a "customer" data element that includes a "sales order" data element, which in turn includes a "product" data element). A metadata tree can be made up of nodes. Each node can include one or more attributes (which represent the actual data elements), as well as one or more child nodes (which can have further attributes and further child nodes).

In certain implementations, a context includes two parts at runtime: (i) a runtime version of the metadata tree, and (ii) an instantiation of the context metadata, which will be referred to as the context tree. The runtime version of the metadata tree can initially be the same as the design-time version of the metadata tree, but it can be modified dynamically during the execution of an application (e.g., to add attributes and/or nodes). The context tree (i.e., the instantiation of the context metadata) holds the actual application data and can be constructed according to the structure defined by the runtime version of the metadata tree.

In the context tree, each node in the runtime version of the metadata tree can correspond to a collection (referred to as a node collection) of node elements. Each node element is a single instance of a node (e.g., a particular customer node with a specific name attribute and a specific address attribute). At runtime, a customer node in the context tree might have a node collection of such node elements, because, for example, a view associated with a corresponding controller might be used to provide a list of customers. In this scenario, the context tree associated with the controller has a node element for each customer, and the entire node collection corresponds to the customer node in the metadata tree.

Figure 2A:
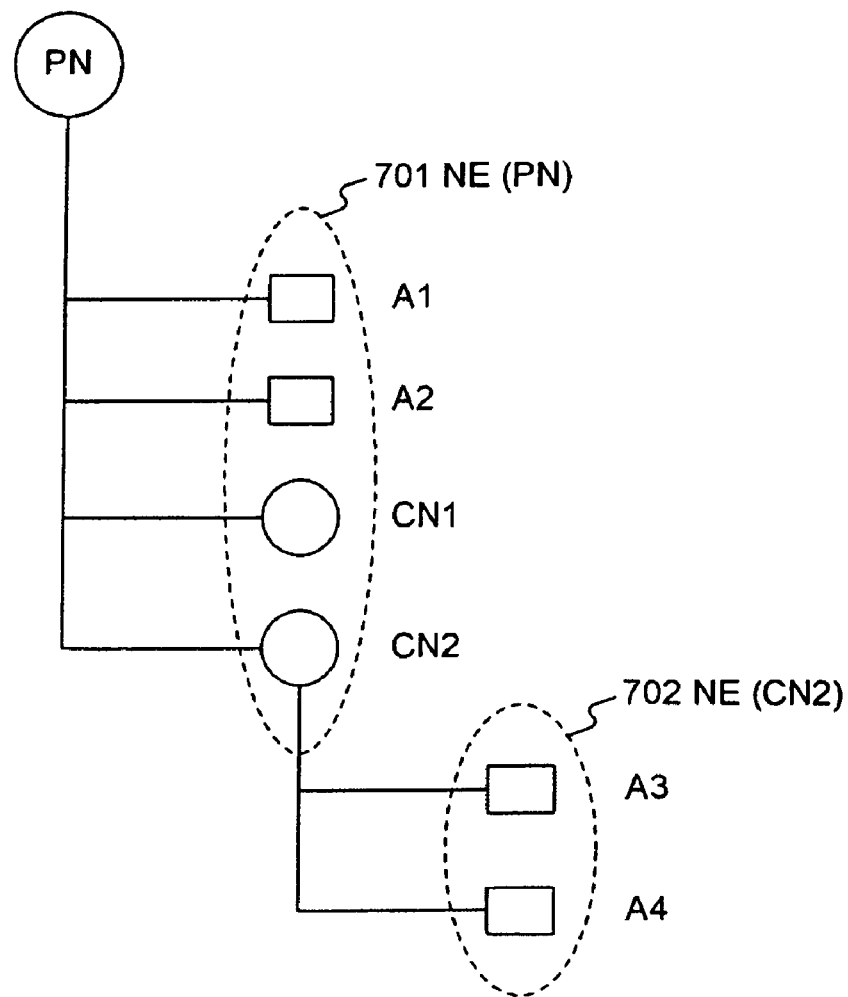
FIG. 2A illustrates an example structure of a context at design-time.
Figure 2A:
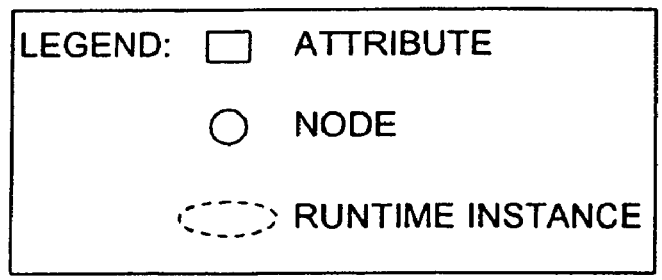
Figure 2B:
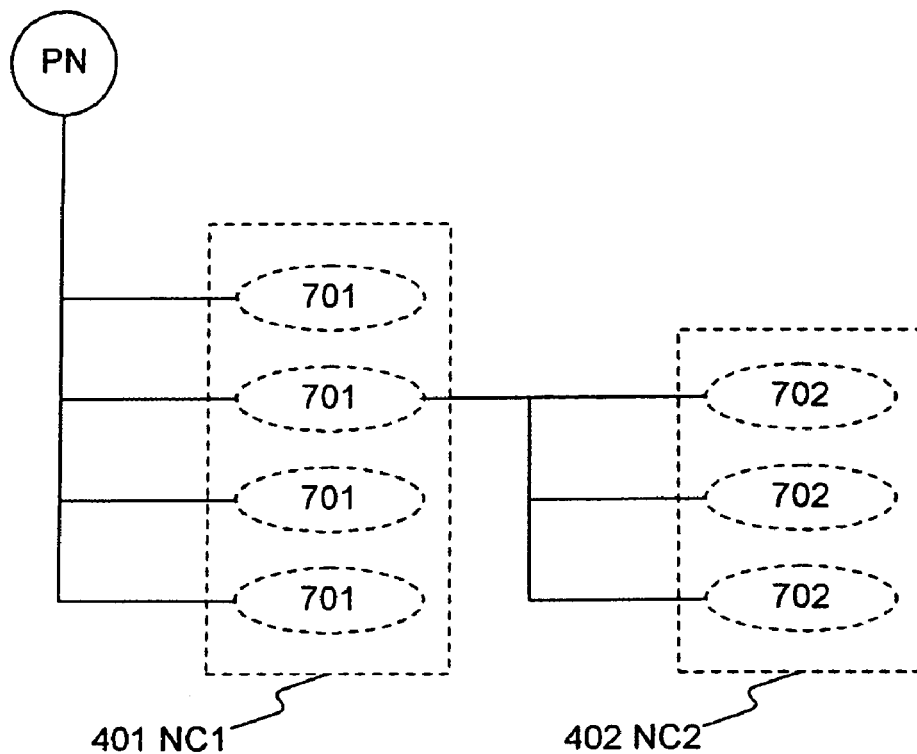
FIG. 2B illustrates an example structure of a context at runtime.
Figure 2B:
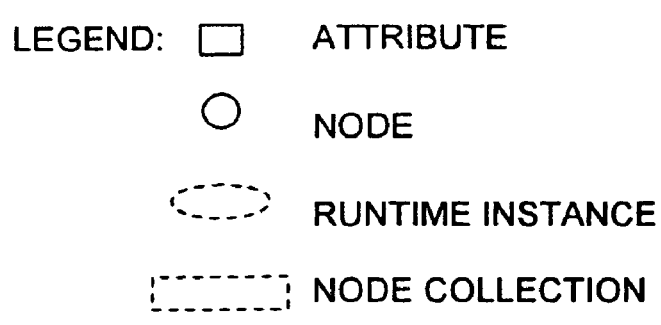

FIGS. 2A and 2B illustrate an example structure of a context 304 at design-time and at runtime, respectively. In general, the structure elements of a design-time context structure can be different from the structure elements of a runtime context structure.

An example of a design-time context structure is a node hierarchy (e.g., a metadata tree), wherein the structure elements of the node hierarchy can be nodes and attributes. The root node of the node hierarchy represents the context itself. The child nodes of the root node can be defined by the application. Child nodes of the root node will be referred to as independent nodes. Child nodes of independent nodes depend on their corresponding parent node and will be referred to as dependent nodes.

A node can have a node type. Examples of node types are value nodes and model nodes. A value node can maintain, that is, store and administer, its own application data (transient application data). The data can be, for example, scalar data, tables, or structures. A model node includes a reference to application data that persists in a corresponding model.

A node can also have attributes. Each child node can include an arbitrary tree structure that includes further child nodes and/or attributes. Attributes are leaves in the tree structure. Attributes can represent, for example, scalar data types (e.g., strings and integers), or Java types (e.g., java.util.Date).

In the example shown in FIG. 2A, at design-time, the context 304 includes the independent node PN, which includes the two attributes A1 and A2, and which is the parent node of the dependent nodes CN1 and CN2. The second depended node CN2 also has two attributes A3 and A4. This structure defines a first node element 701 for the parent node PN and a second node element 702 for the second child node CN2. The first node element 701 includes information about the context structure with regards to the parent node PN. In other words, it describes the context structure level that is under the level of the parent node PN. The second node element 702 includes information about the context structure with regards to the second dependent node CN2. As indicated by the context structure, the second node element 702 depends on the first node element 701.

At runtime, structure elements (e.g., nodes) can represent a set of data instances. Nodes can provide type information about object instances that are maintained by the node. Each node can correspond to a node collection, wherein each element of the node collection has the same node element type.

In the example shown in FIG. 2B, at runtime, the parent node PN has a first node collection 401 that includes multiple runtime instances of the first node element 701. Each runtime instance of the first node element 701 can have a second node collection 402 of multiple runtime instances of the second node element 702. A node collection can be empty or have at least one instance of a corresponding node element.

A node collection can have a node collection type (e.g., a list, tree, set, or collection) and a cardinality. The node collection type (examples of which are shown in Table 1 below) and the node collection cardinality (examples of which are shown in Table 2 below) can be declared at design-time. An evaluation mechanism can be used to automatically evaluate the node collection of a child node at runtime when its parent node changes. An application can use the cardinality of a node collection to restrict possible operations on a node (e.g., prohibiting indexed access to a node that has at most one node collection element).

TABLE 1

Examples of node collection types

| Type | Meaning |
| --- | --- |
| Collection | forward-only iterator (cursor) without absolute positioning |
| Set | no duplicates, forward-only iterator without absolute positioning |
| List | duplicates allowed, position available, list iterator, absolute positioning (indexed access) |

TABLE 2

Examples of the cardinality of a node collection

| Cardinality | Meaning |
| --- | --- |
| 0 . . . 1 | node collection can be empty, contains at most one element |
| 1 . . . 1 | node collection always contains exactly one element |

TABLE 2-continued

Examples of the cardinality of a node collection

| Cardinality | Meaning |
|---|---|
| 0 . . . n | node collection can be empty or contain any number of elements |
| 1 . . . n | node collection always contains at least one element |

The content of a node collection can be determined in various ways. The node values of independent nodes can be set by initializers or event handlers or through a supply function. In one implementation, a supply function is called when a node is first accessed. A node can be accessed, for example, when the node is queried for its data by application code or by a user interface element (in a view) that is bound to the node.

Dependent nodes can get their values through a supply function. For example, the node collection of a dependent node can become obsolete when a selection of its parent node changes (e.g., if a parent "customer" node changes because the user selects a different customer, a child "sales order" node can become obsolete). In this case the dependent node is re-determined; that is, the content of its node collection is determined on a subsequent access. In another implementation, a representation instance is created for each dependent node of a parent node. The values of the representation instances are calculated when the corresponding parent node is accessed. In essence, representation instances create a "load data on demand" or a "unload data when not needed" mechanism, which uses memory in an efficient manner.

The content of a node collection can also be explicitly set to a state, such as "invalid" or "unfilled." When a node having such a state is subsequently accessed, the node collection content is determined again. This can be used to force a re-read of modified data when the modification (e.g., in the model) was not visible to the application runtime.

Figure 3:
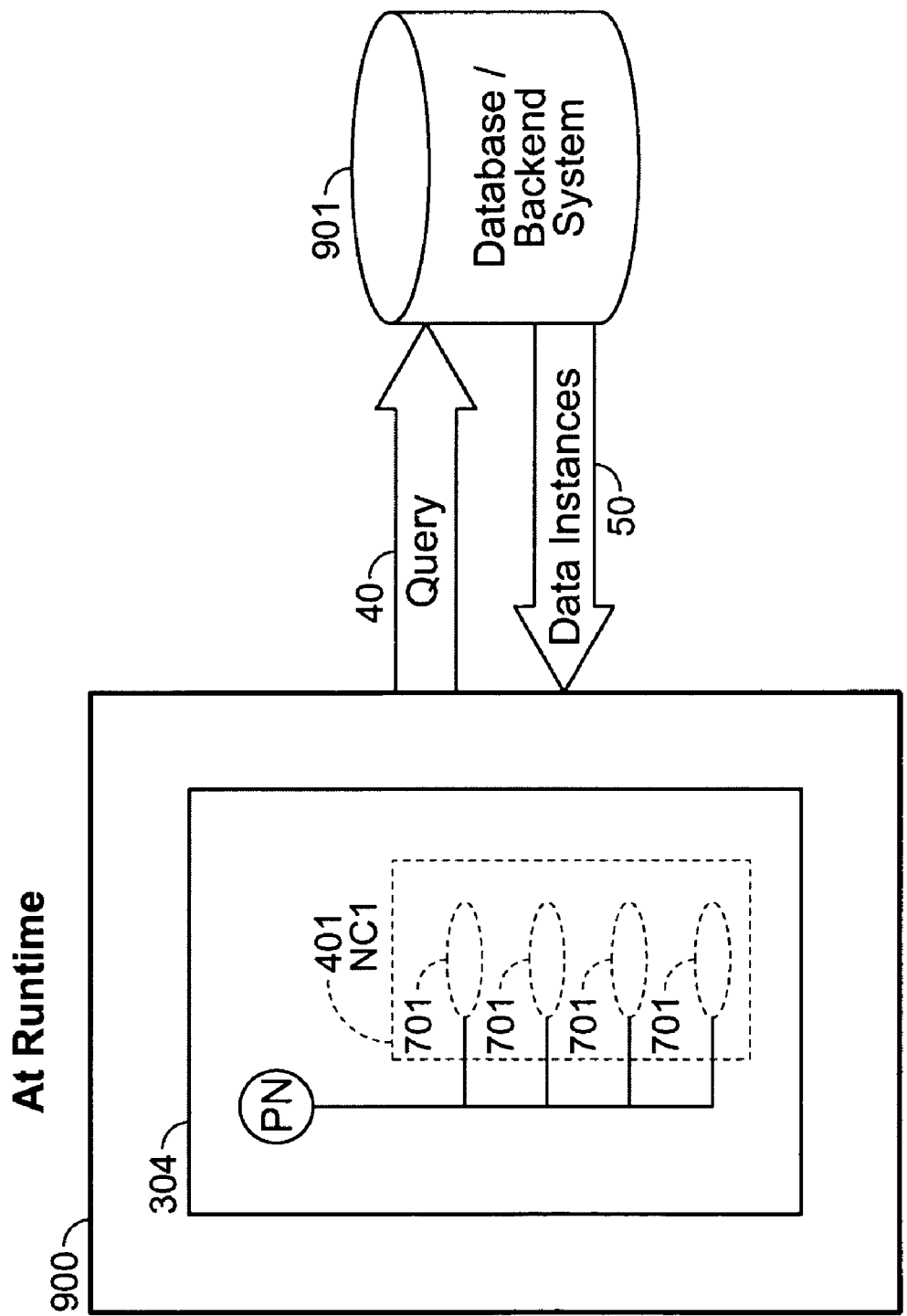
FIG. 3 illustrates a context at runtime as a set of data instances.

FIG. 3 illustrates a context 304 at runtime as a set of data instances. The nodes of the context at runtime represent a system-managed set of data instances (e.g., a java.sql-.RecordSet). For example, data instances are returned 50 from a database or backend system 901 in response to a query (e.g., a structured query language (SQL) query) that is sent 40 from the computer system 900 to the database/backend system 901 when a node is accessed, for example, by an application. Examples of backend systems are Enterprise Resource Planning (ERP) systems, Customer Relationship Management (CRM) systems, web server systems providing web services, or any other system that stores application data. Accessing a node can lead to a data request from an application model, which can result in a corresponding query request to the database/backend system 901.

Nodes can provide type information about the object instances that are maintained by the node. The type information can also be derived from the model. For example, if the parent node PN corresponds to a customer, its node collection 401 can include all orders for this customer. When the application accesses the parent node PN, the computer system 900 can send 40 a query to retrieve all orders of the customer from the corresponding database/backend system 901, such as a sales and distribution (SD) system or a CRM system. The retrieved orders (data instances) are then returned 50 to the computer system 900 context 304 to fill the corresponding data of elements of the node collection 401.

Figure 4:
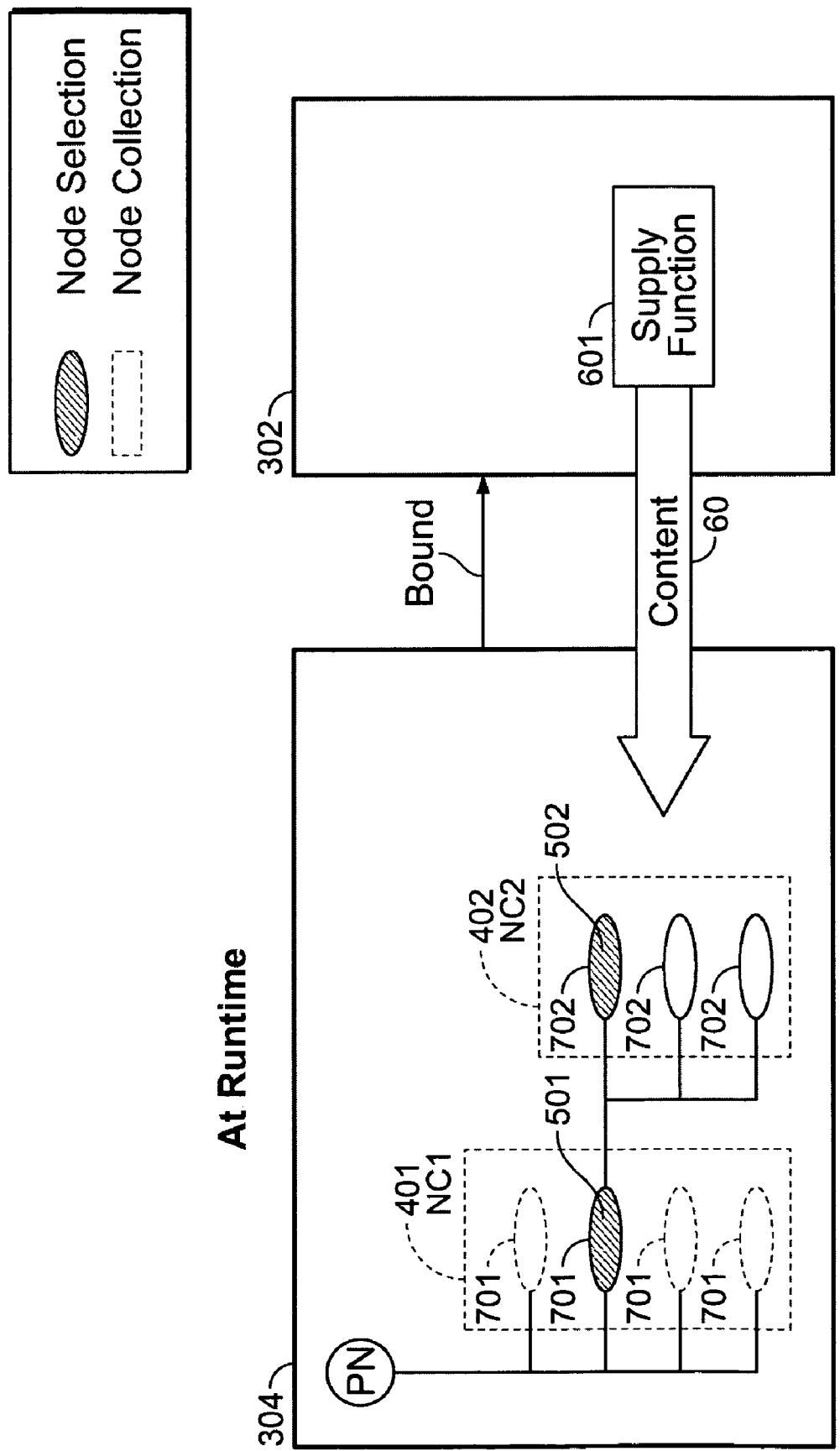
FIG. 4 illustrates an example of a node selection within a context at runtime.

FIG. 4 illustrates an example of a node selection 501 within a context 304 at runtime. A node PN can maintain a node selection 501 within a node collection 401. Node selections are illustrated in FIG. 4 by a grid pattern for each element of the node collection that belongs to the node selection. The node selection 501 is a designated subset of the node collection 401 of the node PN. The node selection 501 has a cardinality that is controlled by the cardinality of the selected nodes declared at design-time (see Table 3 below for examples of the cardinality of a node selection).

One specific element that plays a special role among the elements of the node selection will be referred to as the lead selection element. For example, if the node PN corresponds to customer orders, the first node collection 401 can include all orders of a specific customer. By default, the lead selection of the node collection can be the first order of the customer. In this case, the second node collection 402 can include all order items of the selected order.

TABLE 3

Examples of the cardinality of a node selection

| Node Selection Cardinality | Meaning | Required Node Cardinality |
|---|---|---|
| 0 . . . 1 | single selection (≈lead selection), can be empty | any |
| 1 . . . 1 | single selection (≈lead selection), always contains one element | only 1 . . . 1, 1 . . . n |
| 0 . . . n | multiple selection, can be empty, if not empty one element is designated as the "lead selection" | only 0 . . . n, 1 . . . n |
| 1 . . . n | multiple selection, one selected element is designated as the "lead selection" | only 1 . . . n |

If a node selection is not empty at runtime, one of the elements of the node selection can be designated as the lead selection element. The lead selection element can be accessed from controller code. UI elements can be bound against the attributes of the lead selection element, and the content of a child node can depend on the lead selection element of its parent node. For example, the node selection 501 can correspond to a selection that results from a user action (e.g., a selection by the user of the second order out of a list of orders.) This can automatically trigger an update of the second node collection 402 with, for example, all order items of the second order. The second node collection 402 can have a further node selection 502. A node selection can also include multiple elements of the corresponding node collection.

Node selection and lead selection elements can be bindable node properties, in the sense that UI elements can represent a node selection (e.g., as selected lines in a table control), and can be used to modify the node selection (e.g., by selecting/deselecting items in a table control, which adds/removes the corresponding elements to/from the node selection). Thus, a selection made by a user can be represented as a node selection and a node selection can be visualized in a UI element. Node selections can also exist on their own.

A context can include a flat set of child nodes (independent nodes), each one independent from the others. Each independent node can have further child nodes (dependent nodes). While the content of an independent node is generally defined by an application, the content of a dependent node can depend on the lead selection element of its parent node. An application can define how the content of a dependent node depends on the parent node's lead selection element through the specification of a supply function. For example, a supply function can be used to specify that when a specific order (e.g., node selection 501) of a customer is selected, only order items that are not on stock should be included in the second node collection 402. In other words, the relationships between data that are declared in the context 304 at design-time can be used to select or filter data at runtime.

As another example, a supply function can be defined in such a way that the function always returns the same value for the same selected node element and does not take into account changes in the returned data. In other words, the application runtime can decide not to call a supply function again with the same arguments when the supply function is called a second time within the lifetime of the application.

As another example, when a parent node (e.g., a sales order) is bound to a new node collection, the content of all of its child nodes (e.g., order items) can be marked "invalid." If a node is accessed when its content (node collection) is marked "invalid," its content can be determined again, for example, by calling a corresponding supply function 601 to supply content for the node.

Supply functions can be declared as methods in a corresponding controller 302 of a context 304. The following pseudo code shows an example of the interface or signature of a supply function:

Collection supplyFunction(Node node, NodeElement parentElement).

The code that is generated for an application can include code that calls a declared supply function when the content for a node is to be supplied 60.

Supply functions can be implemented to include one or more of the following features:

Node elements included in a returned node collection can match the type of the corresponding node (e.g., a node element created from the node or from a mapped node or from a corresponding model class, if the node is a model node).

The supply function can return enough data to match the declared cardinality of the node.

The returned node collection can depend on parameters of the supply function. The supply function can be called a second time within the lifetime of an application when at least one of the parameters is changed.

The supply function can be loaded on demand by the application.

The supply function can be used to set the lead selection of a node.

In one implementation, rather than returning a node collection, supply functions can be implemented to modify an existing node collection (e.g., a node collection that is initialized empty). For example, a supply function can be used to provide the content of a node element and add that node element to the node collection to be filled (i.e., the node collection being accessed). Supply functions can also access other node elements, remove node elements, swap or move node elements, and perform other functions on node elements. Supply functions can access the node collection of the node being supplied or the parent node of the node being supplied. In some implementations, supply functions can also access other ancestor nodes, or even nodes in other contexts. Supply functions generally cannot access child nodes (since child nodes have not been initialized when a node is first accessed), and in some implementations, they are restricted from modifying any node collection other than the node collection being evaluated. In a load-on-demand implementation, initializing a node collection to be empty and allowing a supply function to add elements on demand means that the supply function can access the elements of the collection without causing recursion (i.e., without causing the supply function to be invoked again).

In particular implementations, one or more attributes (e.g., attribute A2) can be associated with a routine for obtaining and manipulating application data (e.g., data in backend system 901). The data can, for example, be used for one or more views. Manipulation of the data for the views can process application data into a more user-friendly format. Also, manipulation can process user-provided data back into application data (e.g., into data that is in an appropriate format for storing in a backend system).

For example, an attribute can be capable of calling a routine implemented by the application at access time. This routine can determine a value for the attribute during a read access (using application data as input) or process a passed-on value (and save it to an application buffer, for example) during a write access. Whether of not an attribute has this capability can be specified at design time. For instance, an attribute can have a Boolean attribute at design time that specifies this attribute type. Such attributes will be referred to as calculated attributes.

The processed application data for a calculated attribute can be determined when the attribute of the node element is accessed. That is, the data of a calculated attribute is not necessarily entirely stored by the node element. Therefore, a calculated attribute can be marked in the IDE and controller methods declared.

Many different types of data manipulation routines can be created. An example routine is one that converts a record into a different format. For instance, for a database having the form represented by Table 4, a certain format may be needed or desired for a view of an application. A calculated attribute and its associated routine can be generated to transform the record to the desired view format. For example, a desired view can indicate that a person's name should be represented as last name separated from a first initial by a comma. Thus, a routine could be created and associated with a calculated attribute to transform a database record (e.g., the first row in Table 4) from the particular data format in the record to the appropriate application format (e.g., "Smith, J.").

TABLE 4

Example database

| Title | Gender | First Name | Middle Name | Last Name |
|---|---|---|---|---|
| Mr. | M | John | Wayne | Smith |
| Ms. | F | Alex | Margaret | Roberts |
| Dr. | F | Janice | Emma | Johnson |
| Mr. | M | Jean | Michael | Franks |

In general, manipulation routines can use any combination of functions that transform, merge, combine, format, rearrange, and/or otherwise manipulate data. Another example of a manipulation routine is one that converts, perhaps through a mathematical formula, a designation (e.g., an eighteen-place material number to a twelve-place article number).

A calculated attribute, and, hence, its associated manipulation routine, can be invoked on a controlled basis. That is, all of the data for a calculated attribute does not have to be determined at one time. For example, a calculated attribute can be invoked on an as-needed basis, for instance, to provide data for a view.

Calculated attributes can be read-only or read/write. In the read-only case, a calculated attribute can have an associated getter method. A getter method can, for example, call a declared controller routine with the following signature: AttrClass getNodenameAttributename(NodenameElement element). This signature, however, is just one convention for an IDE; it can be changed by an application developer. The routine can manipulate and return a value based on other values of the element. Consequently, a calculated attribute may be considered to be changed (e.g., it may have no change flag of its own). In implementations in which the calculated attribute corresponds to a view, the data can be sent to the UI when another attribute of the element is changed.

In the read/write case, a routine for a calculated attribute can have a getter method and a setter method. A setter method can have the following signature: void setNodenameAttributename (NodenameElement element, AttrClass value). A setter method could, for example, convert a twelve-place article number entered in a view to an eighteen-place material number. Thus, a setter method can modify other attributes of the element based on the given value. However, it may not mark anything changed by itself, as the modification of other attributes can lead to updates of the UI. An existing read-only attribute can determine whether or not a setter method is created.

Invoking a getter method can occur at any one of a number of points. For example, a getter method can be invoked when the element of the corresponding calculated attribute has not been transported yet in the data transport context and is pending for data transport. As another example, a getter method can be called during every API-based read access to the attribute (e.g., currentElement( ).getAttributeValue( )). This can provide a refresh function as well if the element has already been transported. The element or column of the context node can be flagged when the returned value differs from the previous value. Using these two getter method invocations together can provide efficient use of a paging mechanism, although it can prevent the permanent update of time-dependent calculations.

Invoking a setter method can also occur at any one of a number of points. For example, a setter method can be invoked when the user modifies the calculated attribute. The setter methods of the calculated attributes can be called in the context transport framework. This can wait until after the other non-calculated attributes have been transported (in no specific sequence) to ensure that the application logic contained in the setter methods has access to the current values. The new value, which may only be formally checked with regard to its data type (using a data dictionary parse, for example), can be passed on as a parameter. The old value can still be in the internal buffer variable at this point. After the set function is executed, the application may or may not have changed the internal buffer variables. If the change is UI-relevant, which it usually is, this can be indicated by increasing a ModCount, which can be the responsibility of the application, as illustrated by the pseudo code below, because different situations may arise in which the framework does not recognize this. A setter method can also be invoked during API-based write access to the attribute (e.g., currentElement( ).setAttributeValue(newValue)).

If during the transport phase a setter method reads another calculated attribute that has been changed but not transported yet, the routine can guarantee that this second calculated attribute is transported by this point. One way to accomplish this is to interrupt the execution of the first setter method and append it to the end of the transport queue. An exception can be raised in case of cycles. Attempts at write access to other calculated attributes during the transport phase can also result in an exception.

An example of getting and setting a value for a calculated attribute is illustrated by the following pseudo code:

```
public AttributeBuiltInType
virtualGetter_NODENAME_ATTRIBUTENAME_Get(IPrivateTest.
ITest ModelNode node, IPrivateTest.IContextElement associatedElement,
AttributeBuiltInType internalBuffer)
{
    //@@begin virtualGetter_NODENAME_ATTRIBUTENAME
    (IWDNode,IWDNodeElement, AttributeBuiltInType)
    return someFunction(node, associatedElement, internalBuffer);
    //@@end
}
public void
virtualSetter_NODENAME_ATTRIBUTENAME_Set(IPrivateTest.ITest
ModelNode node, IPrivateTest.IContextElement associatedElement,
AttributeBuiltInType internalBuffer, AttributeBuiltInType newValue)
{
    //@@begin virtualSetter_NODENAME_ATTRIBUTENAME
    (IWDNode,IWDNodeElement, AttributeBuiltInType,
    AttributeBuiltInType)
        if (!internalBuffer.equals(newValue)){
            modCount++;
            associatedElement.setSomeOtherNonCalculated attribute
            (newValue);
}
    //@@end
}.
```

Using the modCount function allows delta handling to be notified if changes are UI relevant.

Calculated attributes can also retain the ability to perform like regular attributes, which means that the context element can provide a variable for calculated attributes as well. This variable is available for the setter/getter method, although it may not be used in the framework. In particular implementations, this variable is a given parameter to be passed.

In certain implementations, it can be possible to create calculated attributes at runtime and register setter/getter methods dynamically. This can be implemented through a mechanism similar to supply/dispose functions for nodes (e.g., publish/subscribe model through implementation of a listener interface).

In particular implementations, calculated attributes cannot be mapped (that is, cannot be mapped to other attributes in other context nodes), but value attributes can be mapped to virtual attributes.

Using calculated attributes provides a variety of features. For example, allowing data for the context to be determined on an as-needed basis provides more efficient memory consumption and reduced CPU consumption and, therefore, improved performance. Additionally, data can be adapted to the needs of a UI without requiring copying of the data. For instance, if an employee's name is stored in a database as title, sex, first name, initial, last name, but should be displayed as title, first name, and last name, a calculated attribute can provide an appropriate routine that takes the five parameters and determines the display name. This routine can be called on an as-needed basis, allowing the display names to only be determined as they are actually required for display in the user interface. For example, if a table contains 2,000 entries and only 25 are displayed at a time, the calculated attribute routine can be called 25 times instead of 2,000 times, leading to a significant performance improvement.

Figure 5:
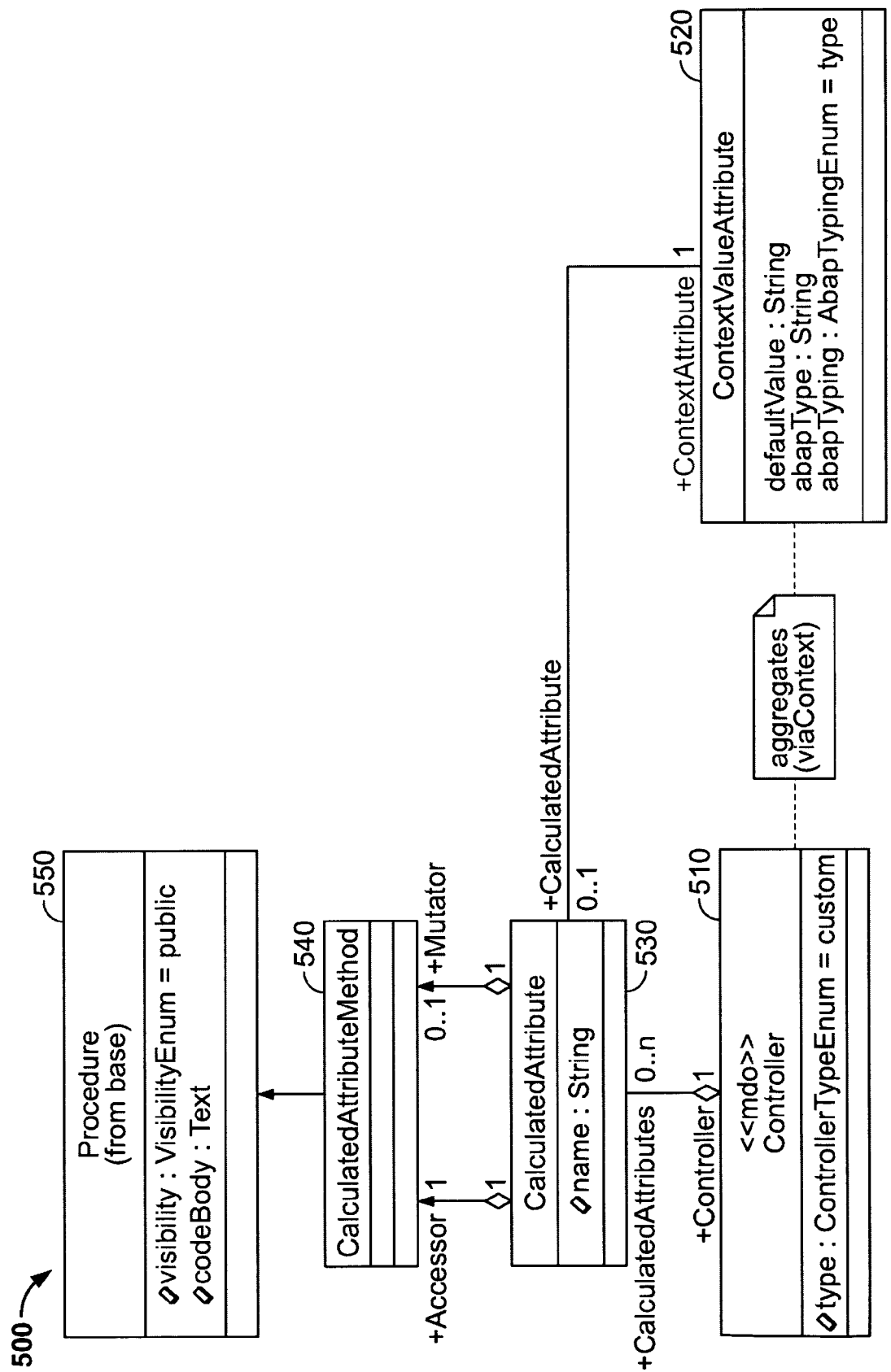
FIG. 5 illustrates a metamodel for context attribute determination.

FIG. 5 illustrates a metamodel 500 for context attribute determination. In particular implementations, metamodel 500 can represent an object-oriented structure. Metamodel 500 includes a controller 510, a context attribute 520, a calculated attribute 530, a calculated attribute routine 540, and a procedure 550. Procedure 500 can be a class that represents general procedures, and calculated attribute routine 540 can be a class that inherits from the procedure class, meaning that it is a special kind of procedure.

In one mode of operation, if context attribute 520 is declared to be a calculated attribute in a context editor, a tool can automatically create a calculated attribute 530, a getter method (accessor), and, optionally, if the attribute is not read-only, a setter method (mutator). Calculated attribute 530 is then associated with context attribute 520. A flag can provide proof of the existence of this association. For example, if ContextValueAttribute.hasCalculated Attribute( ) returns "true", the attribute is a calculated attributed. The names of the getter and setter method can be set as they will be generated later (get/set<node name><attribute name>( )), so they can be displayed correctly in the method overview of the controller editor. The calculated attribute 530 can receive the name <node name><attribute name>.

The accessor and mutator methods of the calculated attribute 530 can be instances of the calculated attribute routine 540. This can allow special handling in the method overview of the controller editor (special icons, limited operations, etc.). These techniques may be similar to those used for supply functions. The accessor and mutator methods are not aggregated by the controller 510 directly, but through a surrounding object (i.e., the calculated attribute 530) to enable the gets and sets to be grouped in the method overview and during generation. Also, accessor and mutator methods are not aggregated directly by the context attribute 520 to prevent iterating across the entire context in order to access all application methods (both in the tool and during generation).

A binding can overlay the "virtual" characteristic of a calculated attribute, meaning that a flag display can be suppressed for a calculated attribute, as the flag is irrelevant for it. The methods can be retained until they are deleted explicitly, however. This is also analogous to supply functions.

Figure 6:
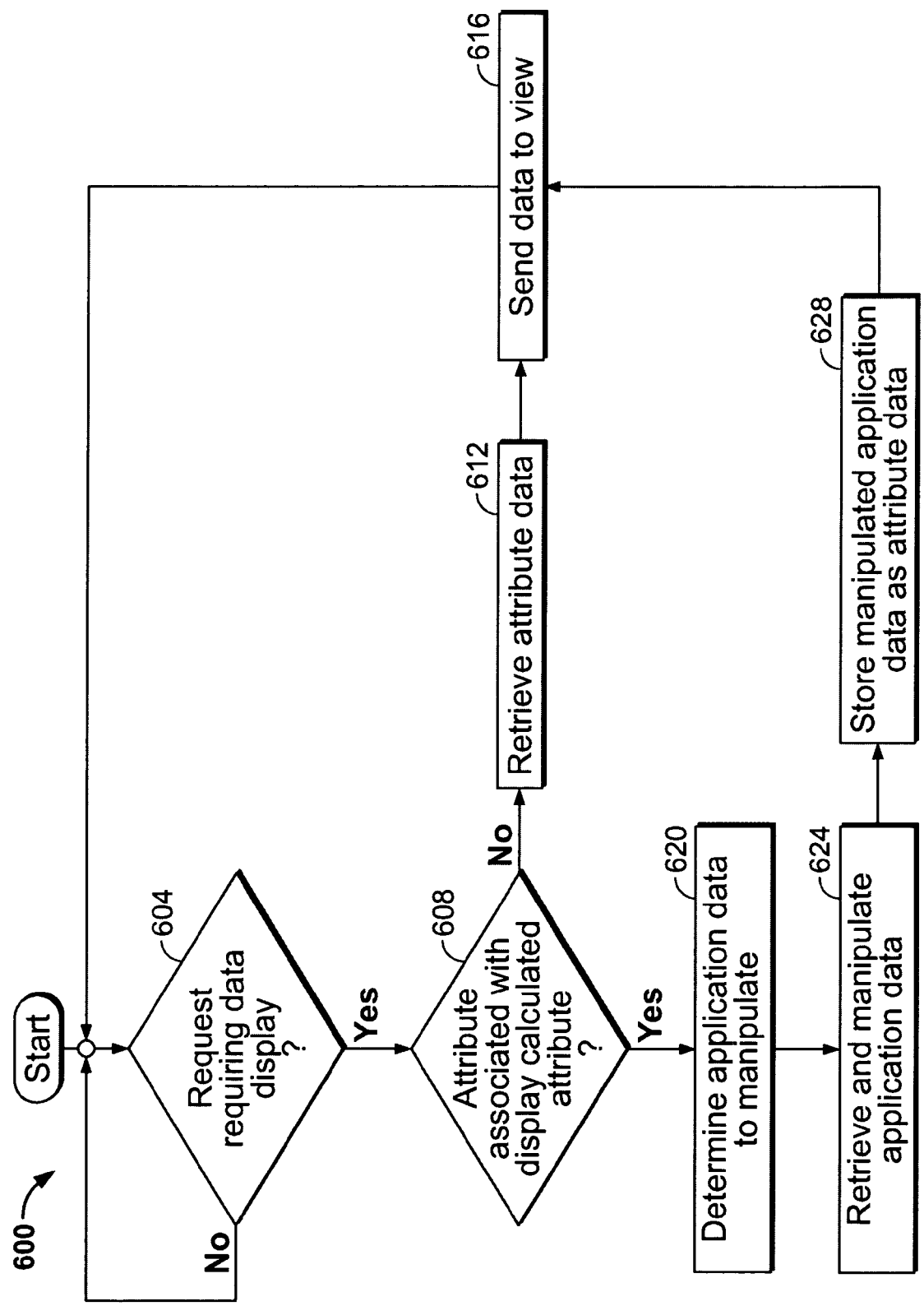
FIG. 6 illustrates a process for context attribute determination.

FIG. 6 is a simplified flow chart illustrating a process 600 for context attribute determination. Process 600 may illustrate one mode of operation for computer system 900.

Process 600 begins with waiting for a request requiring data display in a view (operation 604). The request may be initiated by a user, a routine, or other appropriate entity, and may be received by a controller.

Once a request requiring data display has been received, the process calls for determining whether an attribute associated with the view is a calculated attribute (operation 608). An attribute may be identified as a calculated attribute through any appropriate manner (e.g., a flag). If the associated attribute is not a calculated attribute, the process calls for retrieving the attribute data (operation 612). The attribute data is then sent to a view (operation 616). The process then calls for waiting to receive another data display request (operation 604).

If, however, the associated attribute is a calculated attribute, the process calls for determining application data to manipulate (operation 620). Determining application data to manipulate can, for example, include determining the amount of data to be presented in the view. For instance, it can be determined how many rows a displayed table possesses. The process continues with retrieving and manipulating the application data (operation 624). Retrieving and manipulating the application data can, for example, be accomplished by a routine that includes a getter method and a manipulation method. Manipulating application data can, for example, include merging disparate pieces of application data together. The routines can be part of a controller.

The process calls for storing the manipulated application data as the attribute data (operation 628) and sending the attribute data to the view (operation 616). The process then calls for waiting to receive another data display request (operation 604).

Although FIG. 6 illustrates one process for context attribute determination, other processes for context attribute determination can include fewer, additional, and/or a different arrangement of operations. For example, a process can include setting attribute data. This can, for example, be accomplished with a setter method. As another example, a process can send the manipulated attribute data to the view before storing the data. As a further example, a process can include recursively calling a routine to retrieve and manipulate the application data.

A view controller can relate to a corresponding view. The lifetime of the view controller matches the lifetime of the corresponding view (i.e., the time that the view is displayed). A view context relates to the view controller and has the same lifetime. UI elements of the view can bind to the view context. When executing an application (e.g., APPLICATION A) that is built according to the extended MVC design pattern, typically a sequence of multiple views (e.g., VIEW 1, VIEW 2, VIEW 3, VIEW 4) is presented to a user. The user interacts with the application program through the various views. The various views can raise events that cause the related view controllers to determine which view is presented when and where. Some views, and therefore the related view contexts, can have short lifetimes.

Figure 7:
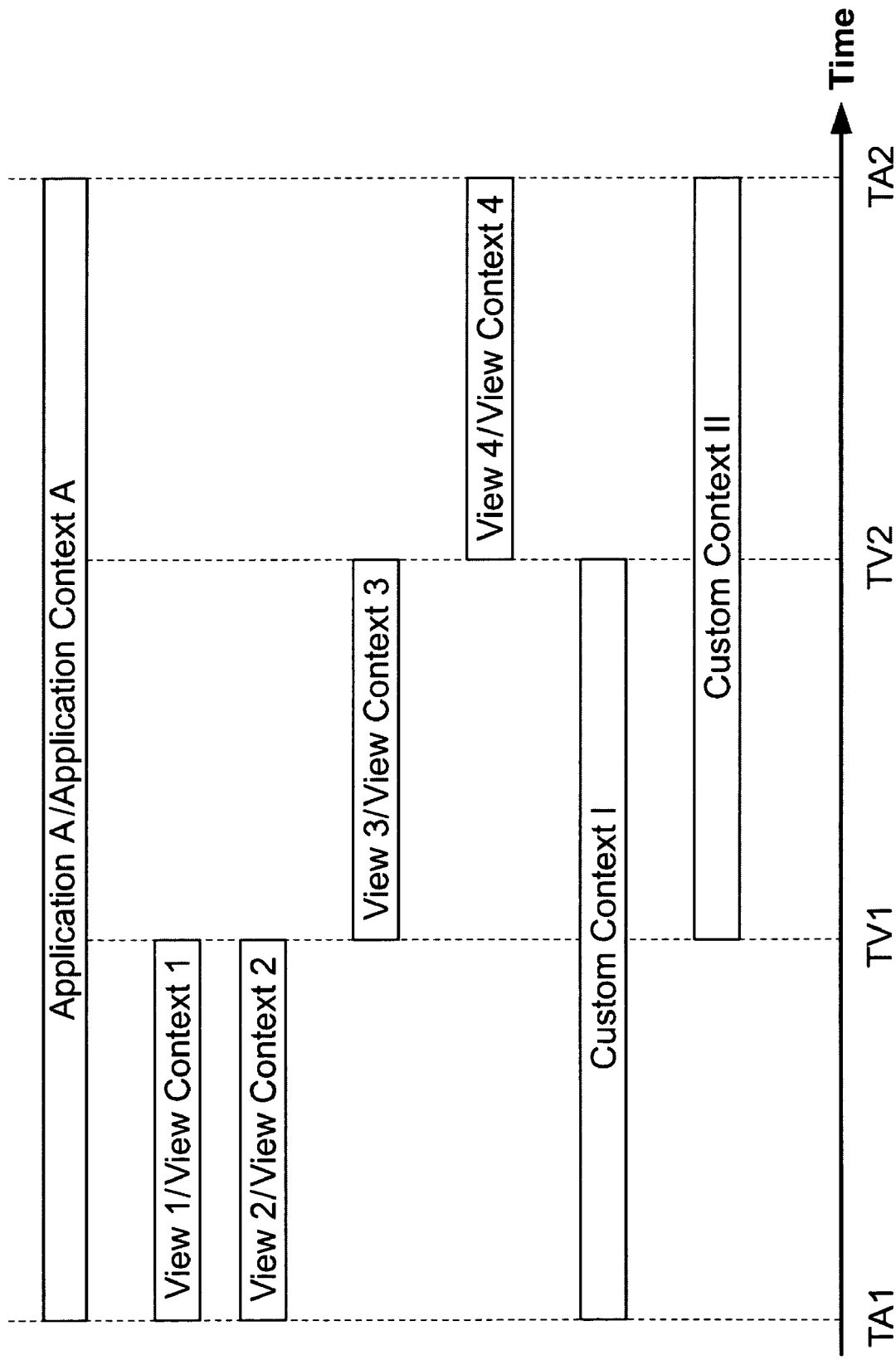
FIG. 7 illustrates an example of context lifetimes for various context types.

In the example in FIG. 7, APPLICATION A starts at TA1 and ends at TA2. When the application starts, VIEW 1 and VIEW 2 are presented to the user simultaneously. At TV1, the corresponding view controllers determine that the presentation of VIEW 1 and VIEW 2 needs to be replaced by a presentation of VIEW 3. At TV2, the corresponding view controller determines that the presentation of VIEW 3 needs to be replaced by a presentation of VIEW 4. The views VIEW 1 to VIEW 4 relate to the view contexts VIEW CONTEXT 1 to VIEW CONTEXT 4. Accordingly, the data that is stored in each view context has the same lifetime as the view that binds to the data.

Some data needs to span the lifetime of multiple views. A custom context can be defined for this purpose. A custom context can relate to a custom controller of the application. A custom controller can be implemented as view-independent, application-process-oriented code. The lifetime of a custom context can be defined in such a way that it spans the lifetime of multiple views.

In the example of FIG. 7, CUSTOM CONTEXT I is defined to span the lifetime of the views VIEW 1 to VIEW 3. CUSTOM CONTEXT II is defined to span the lifetime of the views VIEW 3 and VIEW 4.

A specific example of a custom context is an application context that persists over the lifetime of the application (i.e., over the sequence of all views of the application). In the case of a custom context, the application specifies the context lifetime, whereas in the case of an application context, the system specifies the context lifetime because the system knows when an application starts (TA1) and when it ends (TA2). Therefore, the system can control an application controller that corresponds to the application context.

Figure 8:
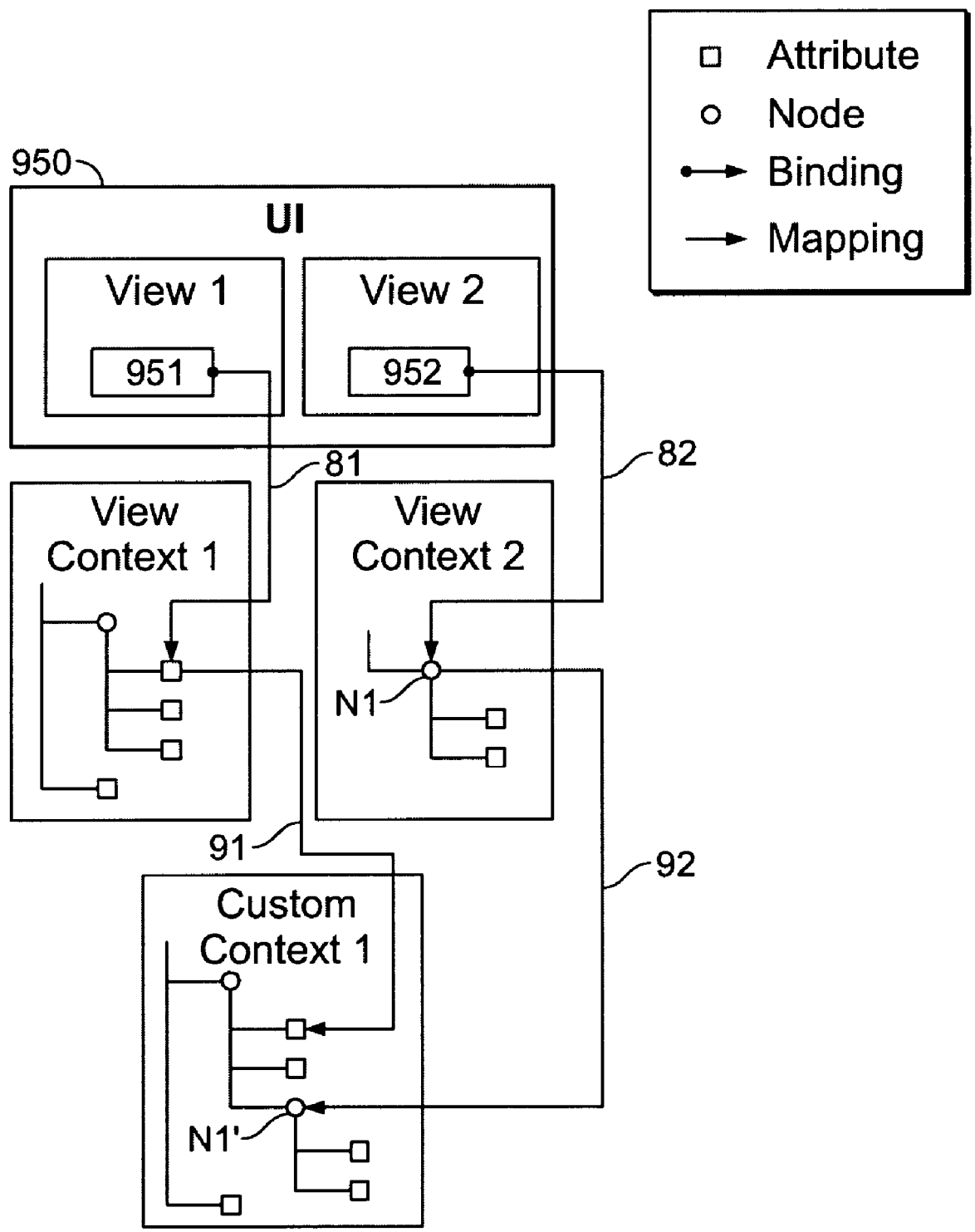
FIG. 8 illustrates an example of mappings between contexts.

FIG. 8 illustrates the concept of mappings between contexts. In the example in FIG. 8, UI elements (e.g., UI elements 951, 952) of views (e.g., VIEW 1, VIEW 2) that are used in a user interface 950 bind 81, 82 to view contexts (e.g., VIEW CONTEXT 1, VIEW CONTEXT 2), and long-persisting data resides in custom contexts (e.g., CUSTOM CONTEXT I). In the implementation shown in FIG. 8, nodes and attributes of view contexts and custom contexts can be mapped 91, 92 to nodes and attributes of other custom contexts. In other words, nodes and attributes of view contexts and custom contexts can reference type-compatible nodes and attributes (including individual nodes and entire sub-trees) in other custom contexts. An example of an attribute that can be mapped is an attribute that represents the value of the lead selection element. Nodes can also be mapped to other nodes within the same context.

Node mapping reduces the need for copying data between multiple contexts by enabling a node N1 of a first context (e.g., a view context, such as VIEW CONTEXT 2, or a custom context) to reference 91 a node N1' of a second context (e.g., a custom context, such as CUSTOM CONTEXT I, or an application context), where the node N1' of the second context has or references the data. The same applies for attributes.

In an implementation that permits mappings between contexts, data can be manipulated in a custom (or application) context, and each view context that references the custom context provides its corresponding view with the current data that is stored in the custom context. Mappings can span multiple context levels. For example, a custom context can reference a further custom context. Context hierarchies can thus be created (see, e.g., FIG. 8).

Mappings allow related data to be collected in a dedicated custom context. Binding to such data can be implemented by using a view context that is mapped to the dedicated custom context.

Mappings allow developers to modify an application quickly while maintaining the consistency of the application data. For example, in some cases rearrangement of views or UI elements can be achieved without modifying the code of the corresponding view controllers. This provides a way for application developers to better structure applications in light of potential functional enhancements or changes. For example, reusing a field that already exists in one view in additional views can be achieved by defining an appropriate mapping.

The invention can be implemented in digital circuitry or in computer hardware, firmware, or software, or in combinations of them. The invention can be implemented as a computer program product (i.e., a computer program tangibly embodied in an information carrier (e.g., in a machine-readable storage device or in a propagated signal)) for execution by, or to control the operation of, a data processing apparatus (e.g., a programmable processor, a computer, or multiple computers). A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method operations of the invention can be performed by one or more programmable processors executing a computer program to perform functions of the invention by operating on input data and generating output. Method operations can also be performed by, and an apparatus of the invention can be implemented as, special purpose logic circuitry (e.g., an FPGA (field programmable gate array) or an ASIC (application-specific integrated circuit)).

Processors suitable for the execution of a computer program include, by way of example, both general and special purpose microprocessors, and any one or more processors of any kind of digital computer. Generally, a processor will receive instructions and data from a read-only memory, a random access memory, or both. The essential elements of a computer are a processor for executing instructions and one or more memory devices for storing instructions and data. Generally, a computer will also include, or be operatively coupled to receive data from, transfer data to, or both, one or more mass storage devices for storing data (e.g., magnetic, magneto-optical, or optical disks). Information carriers suitable for embodying computer program instructions and data include all forms of non-volatile memory, including by way of example semiconductor memory devices (e.g., EPROM, EEPROM, and flash memory devices), magnetic disks (e.g., internal hard disks or removable disks), magneto-optical disks, and CD-ROM and DVD-ROM disks. The processor and the memory can be supplemented by, or incorporated in special purpose logic circuitry.

To provide for interaction with a user, the invention can be implemented on a computer having a display device (e.g., a CRT (cathode ray tube) or FPD (flat panel display) (e.g., LCD (liquid crystal display)) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual, auditory, or tactile); and input from the user can be received in any form, including visual, auditory, or tactile input.

The invention can be implemented in a computing system that includes a back-end component (e.g., a data server), a middleware component (e.g., an application server), a front-end component (e.g., a client computer having a graphical user interface or a Web browser through which a user can interact with an implementation of the invention), or any combination of such back-end, middleware, and front-end components. The components of the system can be interconnected by any form or medium of digital data communication (e.g., a communication network). Examples of communication networks include a local area network ("LAN") and a wide area network ("WAN") (e.g., the Internet).

The computing system can include clients and servers. A client and server are generally remote from each other and typically interact through a communication network. The relationship of client and server arises by virtue of computer programs running on the respective computers and having a client-server relationship to each other.

The invention has been described in terms of particular implementations. Other implementations are within the scope of the following claims.

The invention claimed is:

1. A computer readable medium encoded with a computer program comprising instructions operable to cause a data processing apparatus to:
   establish a model for an application, the model including multiple model elements;
   establish at least one view for presenting application data, the view including multiple user interface (UI) elements;
   establish at least one controller for manipulating the model and the view;
   establish a structure for storing application data for at least one storage area relating to the controller, the structure defined by multiple elements and directed relationships coupling the elements, at least one of the elements associated with a routine operable to receive a request for view data associated with an attribute, retrieve application data associated with the attribute, and calculate a value for the attribute based on the application data; and
   establish at least one binding between one of the UI elements and one of the structure elements.

2. The computer program product of claim 1, wherein the structure elements comprise nodes and attributes.

3. The computer program product of claim 2, wherein the routine is associated with at least one attribute.

4. The computer program product of claim 1, wherein the routine is operable to manipulate application data in the storage area.

5. The computer program product of claim 1, wherein the instructions are operable to invoke the routine on a controlled basis.

6. The computer program product of claim 5, wherein the instructions invoke the routine to fill a displayed portion of the view.

7. The computer program product of claim 1, wherein the routine is operable to receive user-provided data and manipulate the data into an application data format.

8. A system comprising:
   a model for an application, the model including multiple model elements;
   at least one view for presenting application data, the view including multiple user interface (UI) elements;
   at least one controller for manipulating the model and the view;
   a structure for storing application data for at least one storage area relating to the controller, the structure defined according to multiple elements and directed relationships coupling the elements, at least one of the elements associated with a routine operable to receive a request for view data associated with an attribute, retrieve application data associated with the attribute, and calculate a value for the attribute based on the application data; and
   at least one binding between one of the UI elements and one of the structure elements.

9. The system of claim 8, wherein the structure elements comprise nodes and attributes.

10. The system of claim 9, wherein the routine is associated with at least one attribute.

11. The system of claim 8, wherein the routine is operable to manipulate application data in the storage area.

12. The system of claim 8, wherein the controller invokes the routine on a controlled basis.

13. The system of claim 8, wherein the routine is operable to set storage area data.

14. The system of claim 8, wherein the routine is operable to receive user-provided data and manipulate the data into an application data format.

15. A computer readable medium encoded with a computer program comprising instructions operable to cause a data processing apparatus to:
   access a predetermined structure for a storage area, the storage area relating to a controller, the controller being operable to manipulate an application model and a view, the view including multiple user interface (UI) elements for presenting application data, wherein the predetermined structure includes multiple design-time elements and directed relationships between the design-time elements, at least one of the elements associated with a routine for retrieving and manipulating application data, and at least one of the UI elements bound to one of the design-time elements; and
   create an instance of the storage area according to the predetermined structure, the instance of the storage area including multiple runtime elements, each runtime element corresponding to one of the design-time elements.

16. The computer program product of claim 15, wherein the routine is operable to receive a request for view data associated with an attribute, retrieve application data associated with the attribute, and calculate a value for the attribute based on the application data.

17. The computer program product of claim 15, wherein the instructions are operable to invoke the routine on a controlled basis.

18. The computer program product of claim 15, wherein the routine is operable to receive user-provided data and manipulate the data into an application data format.

19. A computer readable medium encoded with a computer program comprising instructions operable to cause a data processing apparatus to:
   establish a model for an application, the model including multiple model elements;
   establish at least one view for presenting application data, the view including multiple user interface (UI) elements;
   establish at least one controller for manipulating the model and the view;
   establish a structure for storing application data for at least one storage area relating to the controller, the structure defined by multiple elements and directed relationships coupling the elements, at least one of the elements associated with a routine for retrieving and manipulating application data; and
   establish at least one binding between one of the UI elements and one of the structure elements;
   wherein an instance of the storage area is created according to the structure, the instance of the storage area including multiple runtime elements, each runtime element corresponding to a design-time element.

20. A system comprising:
   a model for an application, the model including multiple model elements;
   at least one view for presenting application data, the view including multiple user interface (UI) elements;
   at least one controller for manipulating the model and the view;
   a structure for storing application data for at least one storage area relating to the controller, the structure defined according to multiple elements and directed relationships coupling the elements, at least one of the elements associated with a routine for retrieving and manipulating application data; and at least one binding between one of the UI elements and one of the structure elements;

wherein an instance of the storage area is created according to the structure, the instance of the storage area including multiple runtime elements, each runtime element corresponding to a design-time element.

* * * * *